E. A. FEHRENKAMP & A. H. GIESE.
PLOW.
APPLICATION FILED JUNE 15, 1915.
1,201,950.
Patented Oct. 17, 1916.
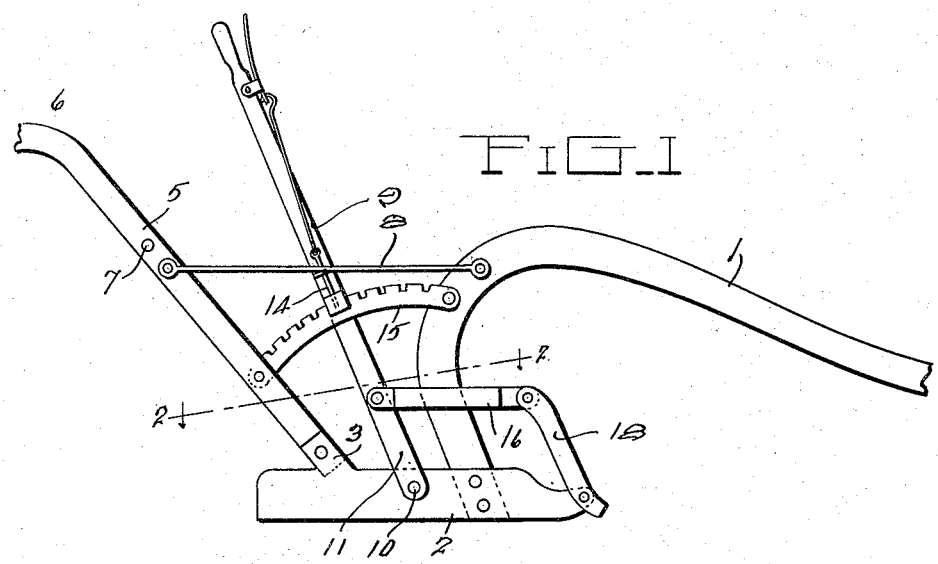
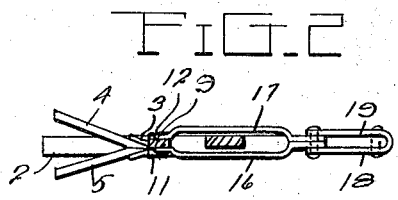
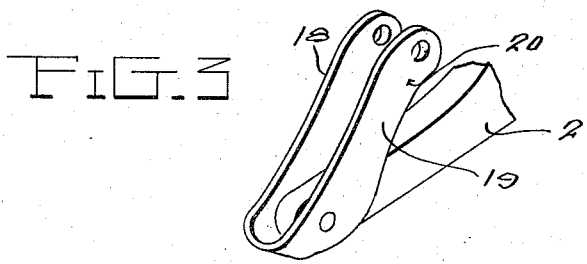
Witnesses
W. M. Duvall
Inventors
E. A. Fehrenkamp
& A. H. Giese

UNITED STATES PATENT OFFICE.

ELO A. FEHRENKAMP AND AUGUST H. GIESE, OF ELLINGER, TEXAS.

PLOW.

1,201,950.  Specification of Letters Patent.  Patented Oct. 17, 1916.

Application filed June 15, 1915. Serial No. 34,197.

*To all whom it may concern:*

Be it known that we, ELO A. FEHRENKAMP and AUGUST H. GIESE, citizens of the United States, residing at Ellinger, in the county of Fayette and State of Texas, have invented certain new and useful Improvements in Plows; and we do hereby declare the following to be a full, clear, and exact description of the invention, such as will enable others skilled in the art to which it appertains to make and use the same.

This invention relates to plows, and the primary object of the invention is to provide a plow construction, wherein the point of the sweep or share of the plow may be quickly and easily adjusted to any desired angle in relation to the runner, for regulating the depth of insertion of the sweep or plow into the ground.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved plow, Fig. 2 is a horizontal section on the line 2—2 of Fig. 1, and Fig. 3 is a detail perspective view of the share or sweep holding member.

Referring more particularly to the drawings, 1 designates the beam of the plow, which has a runner 2 secured to the lower rear end of the same. The runner 2 has an upstanding substantially V-shaped member 3 secured thereto adjacent its rear end, and extending upwardly therefrom. The arms 4 and 5 of the V-shaped member 3 have the lower ends of handles 6, of the ordinary construction, inserted therein, which handles extend upwardly and rearwardly from the member 3, and have their upper ends held in proper spaced relation with respect to each other, by means of a brace 7. Braces 8 are secured to the handles 6 and extend forwardly therefrom, having their forward ends secured to the opposite sides of the beam 1.

The runner 2 has a lever 9 pivotally connected thereto, as is shown at 10. The lever 9 has its lower end bifurcated, forming arms 11 and 12, which have their lower ends positioned upon opposite sides of the runner 2, and pivotally connected thereto. The lever 9 has a dog mechanism 14 of the usual construction carried thereby which coacts with the teeth formed upon an arcuate rack bar 15. The rack bar or quadrant 15 has one end secured to one side of the plow beam 1, and the other end secured to the inner side of one of the handles 6.

The lever 9 has bars 16 and 17 pivotally connected thereto, intermediate its bifurcated end and the rack bar 15. The bars 16 and 17 are positioned upon opposite sides of the beam 1, and they have their forward ends bent inwardly and lying in engagement with each other. The forward bent in ends of the bars 16 and 17 are positioned between and pivotally connected to the legs 18 and 19 of a substantially U-shaped sweep or share holding member 20. The sweep or share holding member 20 has its legs 18 and 19 positioned upon opposite sides of the forward upturned end of the runner 2, as is clearly shown in Figs. 1 and 2 of the drawings, and it is pivotally connected to the runner, for adjustment upon the adjustment or pivotal movement of the lever 9 for regulating the angle of a sweep blade or share which is carried thereby. The spacing of the legs 18 and 19 of the U-shaped member 20, will facilitate the attachment of a sweep or share thereto.

In reducing the invention to practice, certain minor features of construction, combination and arrangement of parts may necessitate alteration, to which the patentees are entitled, provided such alterations are comprehended within the scope of what is claimed.

What is claimed is:—

1. In a plow structure, the combination, of a plow beam, a runner secured to the lower end of said beam, a substantially U-shaped share supporting member pivotally connected to the forward end of said runner, said U-shaped member having its legs positioned upon opposite sides of said runner, a pair of bars pivotally connected to the upper ends of said legs and extending rearwardly therefrom being positioned upon opposite sides of said beam, and a lever pivotally connected to said runner, said last named bars being pivotally connected to said lever for pivotally moving said U-shaped member upon pivotal movement of the lever, and means for holding said lever in various adjusted positions.

2. In a plow structure, the combination, of a plow beam, a runner secured to the lower end of said beam, a substantially U-shaped share supporting member pivotally connected to the forward end of said runner, said U-shaped member having its legs positioned upon opposite sides of said runner, a pair of bars pivotally connected to the upper ends of said legs and extending rearwardly therefrom being positioned upon opposite sides of said beam, a lever pivotally connected to said runner, said last named bars being pivotally connected to said lever for pivotally moving said U-shaped member upon pivotal movement of the lever, means for holding said lever in various adjusted positions, handles, said means including a quadrant attached to said handles and the beam of the plow structure, and a dog mechanism carried by said lever for coaction with said quadrant.

In testimony whereof we affix our signatures in presence of two witnesses.

ELO A. FEHRENKAMP.
AUGUST H. GIESE.

Witnesses:
H. H. SEDLMEYER,
HENRY ENGBROCK.

Copies of this patent may be obtained for five cents each, by addressing the "Commissioner of Patents, Washington, D. C."